United States Patent
Bai et al.

(10) Patent No.: US 12,497,734 B2
(45) Date of Patent: Dec. 16, 2025

(54) METHOD FOR CO-PRODUCING MOLDED FOOD-CONTAINER PULP AND FULVIC ACID FROM COTTON STALK

(71) Applicants: Yufang Liu, Shanghai (CN); Bo Bai, Shanghai (CN); Jiani Bai, Shanghai (CN)

(72) Inventors: Bo Bai, Shanghai (CN); Jiani Bai, Shanghai (CN); Dong Wang, Shanghai (CN); Yufang Liu, Shanghai (CN); Xiaofei Shi, Shanghai (CN)

(73) Assignees: Liu Yufang, Shanghai (CN); Bo Bai, Shanghai (CN); Jiani Bai, Shanghai (CN)

( * ) Notice: Subject to any disclaimer, the term of this patent is extended or adjusted under 35 U.S.C. 154(b) by 208 days.

(21) Appl. No.: 18/024,193

(22) PCT Filed: Aug. 13, 2021

(86) PCT No.: PCT/CN2021/112488
§ 371 (c)(1),
(2) Date: Mar. 1, 2023

(87) PCT Pub. No.: WO2022/062762
PCT Pub. Date: Mar. 31, 2022

(65) Prior Publication Data
US 2023/0220623 A1     Jul. 13, 2023

(30) Foreign Application Priority Data
Sep. 28, 2020   (CN) .......................... 202011043832.3

(51) Int. Cl.
| | | |
|---|---|---|
| D21C 11/00 | (2006.01) | |
| D21C 3/06 | (2006.01) | |
| D21C 3/22 | (2006.01) | |
| D21C 5/00 | (2006.01) | |
| D21D 1/20 | (2006.01) | |
| D21H 11/12 | (2006.01) | |
| D21H 27/10 | (2006.01) | |

(52) U.S. Cl.
CPC ............ *D21C 11/0007* (2013.01); *D21C 3/06* (2013.01); *D21C 3/222* (2013.01); *D21C 5/005* (2013.01); *D21D 1/20* (2013.01); *D21H 11/12* (2013.01); *D21H 27/10* (2013.01)

(58) Field of Classification Search
CPC ...... D21C 11/0007; D21C 3/06; D21C 5/005; D21D 1/20; D21H 11/12
See application file for complete search history.

(56) References Cited

U.S. PATENT DOCUMENTS

| | | | |
|---|---|---|---|
| 12,037,745 B2 * | 7/2024 | Bai ................ | D21C 11/0007 |
| 2012/0325421 A1 * | 12/2012 | Li ..................... | C05F 17/80 |
| | | | 162/189 |
| 2015/0284911 A1 | 10/2015 | Juvonen et al. | |

FOREIGN PATENT DOCUMENTS

| | | | |
|---|---|---|---|
| CN | 1986960 A | 6/2007 | |
| CN | 101352296 A | 1/2009 | |
| CN | 101831822 A | 9/2010 | |
| CN | 102154906 A | 8/2011 | |
| CN | 102635014 A | 8/2012 | |
| CN | 102985613 A | 3/2013 | |
| CN | 103215837 A | 7/2013 | |
| CN | 104846680 A | 8/2015 | |
| CN | 108252134 A | 7/2018 | |
| CN | 108611912 A | 10/2018 | |
| CN | 109183480 A * | 1/2019 | .............. D21B 1/16 |
| CN | 111118939 A | 5/2020 | |
| CN | 112127194 A | 12/2020 | |
| JP | H06-17399 A | 1/1994 | |
| JP | 2017-186710 A | 10/2017 | |
| WO | WO-2009015555 A1 * | 2/2009 | .............. D21C 5/00 |
| WO | WO-2009015556 A1 * | 2/2009 | .............. D21C 5/00 |
| WO | WO-2011113329 A1 * | 9/2011 | ................ C02F 3/30 |
| WO | WO-2016179846 A1 * | 11/2016 | ............. D21C 11/00 |
| WO | WO-2020048176 A1 * | 3/2020 | ............. C05F 11/02 |

OTHER PUBLICATIONS

English Machine translation of CN109183480A, Jan. 1, 2019 (Year: 2019).*
Nov. 18, 2021 International Search Report issued in International Patent Application No. PCT/CN2021/112488.
Nov. 18, 2021 Written Opinion issued in International Patent Application No. PCT/CN2021/112488.
Oct. 19, 2021 Search Report issued in Chinese Patent Application No. 2020110438323.
Oct. 26, 2021 Office Action issued in Chinese Patent Application No. 202011043832.3.
Jan. 11, 2022 Search Report issued in Chinese Patent Application No. 2020110438323.
Jan. 18, 2022 Office Action issued in Chinese Patent Application No. 202011043832.3.
Zhao, Yumeng. "Research on the Pretreatment Process of Pectin Removal in APMP." Proceedings of 17th China Paper Association Academic Annual Conference. pp. 107-112. (2016).
Peng Yuan. "Research on the Technology of Pulp for Paper Dishware." Doctoral dissertation, Northeast Forestry University. (2006).

* cited by examiner

*Primary Examiner* — Anthony Calandra
(74) *Attorney, Agent, or Firm* — Oliff PLC

(57) ABSTRACT

A method for co-producing molded food-container pulp and fulvic acid from cotton stalk, which belongs to the field of comprehensive utilization of crop straw resources. The method adopts digesting, defibering and bio-treating measures to remove pectin and hemicellulose and other anionic waste generating sources in cotton straw raw materials to obtain a pulp with low beating degree; and retains part of lignin to help form oil-proof and waterproof film of a molded food-container and improves the stiffness and water filtration of the molded food-container and increases a yield of fiber pulp; adopts ammonium sulfite method to pulping to meet fiber requirements while obtaining fulvic acid.

9 Claims, No Drawings

METHOD FOR CO-PRODUCING MOLDED FOOD-CONTAINER PULP AND FULVIC ACID FROM COTTON STALK

CROSS-REFERENCES TO RELATED APPLICATIONS

This application claims priority benefits to Chinese Patent Application No. 202011043832.3, filed 28 Sep. 2020, the contents of which are incorporated herein by reference.

TECHNOLOGY FIELD

This invention belongs to a field of comprehensive utilization of crop straw resources, and particularly relates to a method for co-producing molded food-container pulp and fulvic acid from cotton stalk.

BACKGROUND

Any discussion of the prior art throughout the specification should not be taken as an admission that such prior art is widely known or forms part of the common general knowledge in the art.

The technical development of straw molded food-container pulp conforms to the national industrial policy. By the end of 2020, it is forbidden to use non-degradable disposable plastic tableware for dining and dining services in built-up areas and scenic spots of cities above prefecture level. By the end of 2022, it is forbidden to use non-degradable disposable plastic tableware for dining and dining services in built-up areas and scenic spots of county towns. By 2025, the consumption intensity of non-degradable disposable plastic tableware in the catering and take-out areas in cities above prefecture level will be reduced by 30%. Opinions on strengthening plastic pollution control pointed out that clear promotion and application of alternative products and models, the promotion of the use of bio-based products such as straw-coated food-containers in the field of catering take-out in line with the performance and food safety requirements; as well as strengthen scientific and technological support, increase the research and development of key core technologies of recyclable and degradable materials and the transformation of results, improve the performance of alternative materials and products.

The application technology of straw molded food-container materials needs to be broken through urgently. At present, the materials used to produce molded food-containers are limited to bagasse chemical pulp, reed chemical pulp and a small amount of wheat stalk chemical pulp, which generally have the problems of poor water filtration and low soft and low strength. However, due to technical reasons, although the non-wood fiber chemical-mechanical pulp with large quantity and wide range has high stiffness and good water filtration, its oil-proof and waterproof performance cannot meet the requirements, which greatly limits the application of straw molded food-containers.

The prior art has studied the production of molded food-container and molded food-container pulp from different aspects:

Peng Yuan analyzed the molding mechanism of molded food-containers, pointed out the role of lignin in the performance of molded food-containers against oil and water leakage, and the limitations of chemical pulp for production of molded food-containers. (Peng Yuan. 2006. Research on Pulp Technology for Molded Food-containers. Doctoral dissertation, Northeast Forestry University). However, the production of chemical-mechanical pulp generally suffers from difficulties in pulping effluent treatment and anionic barriers when used in the production of molded food-containers.

Huo Dan et al. pointed out that the source of anionic waste in chemical mechanical pulp production process is dissolved hemicellulose, low molecular weight lignin, pectinic acid, resin acid, fatty acid and other highly negative electric substances dissolved in the pulp water system. (Huo D, Xie D, Yang Qiu Lin. Generation and effects of anionic waste in chemical mechanical pulp pulping process[J]. Tianjin Paper Making, 2016, 38(4):4.)

Chinese Patent Application No. 200810214079.2 discloses a grass pulp making method, the grass pulp used is an unbleached grass pulp, a whiteness of the grass pulp is 35-45% ISO, the grass pulp has a breaking length of 5.0-7.5 km, a tearing degree of 230-280 mN, a folding resistance of 40-90 times, and a beating degree of 28-34° SR. Wherein the grass pulp includes pulp made from one or more of wheat stalk, rice straw, rushes, reeds and cotton stalks by conventional pulping methods, and the hardness of the pulp made after digesting in the pulping process is 16-25 (potassium permanganate value). The conventional pulping method comprises an ammonium sulfite method and an alkaline method, wherein the alkaline method comprises soda-anthraquinone method, sulfate method and sodium sulfite method, wherein 0-0.8% NaOH was added during digesting by ammonium sulfite method. The inventor found that the patent did not address the issue of anions of cotton stalk pectin and hemicellulose and did not control the pH value in the digesting process; moreover, the exploitation of fulvic acid was neglected in the pulping process, and the content of Na ions was not limited, and the content of sulfonated lignin in the black liquor and even in fulvic acid was not effectively controlled.

SUMMARY

In response to the deficiencies of the prior art, the present invention provides a method for co-producing molded food-container pulp and fulvic acid from cotton stalk.

The present invention uses the following technical solutions:

In one aspect of the present invention, a method for co-producing molded food-container pulp and fulvic acid from cotton stalk, the method comprises:

Step 1: pulping, comprising:
digesting a cotton stalk raw material to hydrolyze hemicellulose and pectin and retain part of lignin to obtain a pulp;
defibering the pulp by a high consistency refiner and separating to obtain a coarse pulp and a pulping black liquor;
defibering the coarse pulp by a low consistency refiner to expose residual hemicellulose and residual pectin to obtain a semi-finished pulp;
bio-treating the semi-finished pulp to remove residual hemicellulose and residual pectin, and to remove anionic waste to obtain a final pulp;
wherein, digesting the cotton stalk raw material by adopting an ammonium sulfite method; and a by-product of the digesting process is fulvic acid;
wherein, fulvic acid is also obtained as a by-product while obtaining the finished pulp with the low beating degree for molded food-container that removes anionic waste and retains some lignin;

step 2: pulp proportioning;

in other words, mixing of a cotton stalk molded food-container pulp having low beating degree and a straw chemical pulp having high beating degree to adjust the pulp to reduce the beating degree and increase the water filtration.

It is found that there are many unsuitable problems in the production of molded food-container by chemical pulp and chemical-mechanical pulp. First, chemical pulp almost completely removes lignin, which makes the waterproofing film lack a necessary component, and at the same time, the water filtration is poor, and the stiffness of the food-container is low; the second is chemical-mechanical pulp, which retains hemicellulose and lignin as much as possible, and there is a large amount of anionic waste, which leads to a large consumption of oil-proofing and waterproofing agents, increases production costs, and cannot effectively prevent oil and water. At the same time, it is difficult to treat pulping wastewater. Therefore, the present invention proposes a comprehensive solution to the problem, namely, not only to eliminate the anionic waste, but also to ensure the retention of some lignin so that it can form an oil-proofing and waterproofing film layer with an oil-proofing auxiliary, and to improve the stiffness and water filtration of food-containers, and this idea is carried through the "whole pulping process" to form a complete technical solution. After long-term technical research and practical exploration, it is found that the combination of acidic ammonium sulfite method and high and low consistency defibering plus biological treatment can effectively remove hemicellulose and pectin in a pulp, retain necessary lignin components, achieve good oil-proof and waterproof effects, and obtain a finished pulp with good filtration and stiffness and obtain fulvic acid as a by-product.

In another aspect of the present invention, a cotton stalk molded food-container pulp prepared by any of the methods mentioned above is provided.

The beneficial effects of the present invention are as follows:

(1) the present invention systematically solves the problem of anionic waste. The formation of anionic waste is controlled at the source, and the problems of semi-chemical pulp yield and excessive consumption of oil-proofing and waterproofing auxiliaries by pectin, hemicellulose and anionic waste are completely solved by three steps, i.e. digesting, defibering and biological treatment.

(2) The present invention retains the necessary lignin components, which ensures the basic elements of forming oil-proofing and waterproofing film for food-containers, improves the hardness of pulp, and thus improves the stiffness of molded food-containers.

(3) The present invention reduces the beating degree and improves the water filtration. The addition of cotton stalk pulp reduces the overall beating degree of a food-container pulp and improves the water filtration.

(4) Comprehensive utilization. The process can get both molded food-container pulp and fulvic acid, the added value of fulvic acid is much higher than the molded food-container pulp, increasing the economic benefits of industrial production of straw comprehensive utilization.

(5) Cleaner production. Pulping black liquor is fulvic acid, which eliminates pulping pollution from the source.

(6) Scheme integration to improve efficiency. The three-step process for solving pectin, the three-step process for solving hemicellulose and the two-step process for obtaining fulvic acid are organically combined into one production system.

(7) Integration of technical advantages of molded food-container. The present invention combines the advantages of chemical pulp, chemical-mechanical pulp and semi-chemical pulp and makes up for their shortcomings. The molded food-container pulp obtained by the present invention retains the advantages of chemical pulp in purifying fibers, and makes up for the problems of lacking of lignin, insufficient stiffness and poor water filtration of chemical pulp used in molding food-containers, gives advantages of high stiffness and good water filtration of chemical-mechanical pulp, and makes up for the difficulties in treating anionic waste and pulping effluent of chemical-mechanical pulp, takes advantage of sulfite pulping to retain cellulose and some lignin and remove most of hemicellulose.

(8) The present invention has expanded the application field of straw fiber to produce molded food-container pulp.

(9) The preparation method of the present invention is simple, easy to operate, practical and easy to promote.

DETAILED DESCRIPTION

It should be noted that the following detailed descriptions are exemplary and are intended to provide further illustration of the present invention. Unless otherwise indicated, all technical and scientific terms used herein have the same meaning as commonly understood by one of ordinary skill in the art to which the present invention belongs.

It should be noted that the terminology used herein is intended to describe specific embodiments only and is not intended to limit the exemplary embodiments according to the present invention. As used herein, unless the context clearly indicates otherwise, the singular form is also intended to include the plural form, and it is further understood that when the terms "comprising" and/or "including" are used in this specification, they indicate the presence of features, steps, operations, devices, components, and/or combinations thereof.

Explanation of Terms

In the present invention, penetrant (JFC) refers to fatty alcohol polyoxyethylene ether.

EDTA refers to ethylenediaminetetraacetic acid.

The inventor proposed a technical solution to the problem based on the analysis of the characteristics of cotton stalk fiber composition and the advantages and limitations of the existing pulping methods according to the forming mechanism of molded food-containers.

Firstly, the composition and distribution of cotton stalk raw materials were clarified. High pectin content is a prominent feature of chemical components of cotton stalk. According to research, a pectin content of cotton stalk is as high as 4.9%, while that of wheat stalk is only 0.3%, and that of corn stalk is only 0.45%.

According to the research results of Li Qun's (Li Qun. Progress in the characteristics of cotton stalk fiber raw material and its chemical pulp production process [J]. Tian Jin Paper Making. 2007, 29(2):7), the pectin distribution of cotton stalk raw materials is shown in the following table:

| Sites | Ash | Extract | | | | Lignin | Pentosan | Holocellulose | Pectin |
| --- | --- | --- | --- | --- | --- | --- | --- | --- | --- |
| | | Cold water | Hot water | Benzene alcohol | 1% NaOH | | | | |
| Whole stalk | 2.98 | 4.27 | 6.65 | 1.82 | 25.18 | 22.00 | 18.80 | 73.24 | 4.9 |
| Xylem | 1.86 | 2.52 | 3.80 | 1.54 | 19.7 | 21.13 | 18.82 | 74.10 | 3.3 |
| Cortex | 5.32 | 8.12 | 10.2 | 3.07 | 37.82 | 19.22 | 16.20 | 72.25 | 9.3 |
| Pith | 3.05 | 2.94 | 5.13 | 1.54 | 28.31 | 17.06 | 19.97 | 70.04 | 3.0 |

Proportion of each site of cotton stalk: the cortex, the xylem and the pith account for 26%, 70% and 4% of the weight of the whole stalk, respectively.

It is calculated that the pectin content of the cortex part and other parts (xylem part and pith part) are each 50%.

| | Cortex | Xylem | Pith |
| --- | --- | --- | --- |
| Pectin content | 9.3% | 3.3% | 3.0% |
| Weight ratio of each site | 26% | 70% | 4% |
| Relative amount of pectin in each site | 2.418 | 2.31 | 0.12 |
| Total relative amount of pectin | 2.418 | 2.43 | |

The above analysis shows that half of pectin content exists in fiber.

It can also be seen from the table that pentosan, that is, hemicellulose, is evenly distributed in all sites of fiber.

Secondly, according to the forming mechanism of molded food-container, the advantages, limitations, and shortcomings of existing pulping methods are analyzed:

Chemical pulp, which completely removes lignin and hemicellulose, purifies the fiber, but omits a major component in the system to form an oil-proof and waterproof film, that is, lignin, at the same time, has the problems of insufficient stiffness of food-containers and poor molding water filtration.

Chemical-mechanical pulp, including alkaline peroxide mechanical pulp (APMP), Pre-conditioning refiner chemical alkaline peroxide mechanical pulp (PRC-APMP), bleached chemi-thermal mechanical pulp (BCTMP), extrusive chemical-thermomechanical pulp (ECTMP) and so on, which is characterized by retaining hemicellulose and lignin as much as possible to improve the yield. As a result, anionic waste dominated by pectin and hemicellulose degradation components seriously consumes positive oil-proof and waterproof auxiliaries, which makes it impossible to prevent water and oil, and it is difficult to treat pulping black liquor.

Traditional sulfite pulping has not targeted to remove hemicellulose and pectin residues according to the requirements of molded food-container pulp.

In view of the shortcomings of the prior art, the present invention provides a method for co-producing molded food-container pulp and fulvic acid from cotton stalk, the details are as follows:

Technical Ideas to Solve the Problem

The present invention analyzes and provides technical ideas to solve technical problems based on the pulp formation mechanism of molded food-container.

According to the requirements of the forming mechanism of molded food-container pulp, various factors affecting the formation of pulp and oil and water resistance, etc. are systematically sorted out to bring into play the positive factors and suppress and overcome the negative factors.

First, enabling the role of positive factors, comprising:
(1) purifying cellulose to improve the hydrogen bonding between fibers;
(2) retaining some lignin, causing the lignin to deform under high temperature and high pressure, and combining with the oil-proof agent to form an oil-proofing and waterproofing film;
(3) solving the stiffness problem of the molded food-container, adopting the pulp with higher hardness;
(4) improving water filtration by adjusting the beating degree and improving the efficiency of production;
(5) improving the oil-proof and waterproof performance.

The second is to reduce the influence of negative factors, mainly the problem that anionic waste consumes oil-proofing and waterproofing agent, comprising:
(6) removing hemicellulose to control the negative effect of hemicellulose on the molded food-container. Hemicellulose is easy to absorb water, brittle, and hemicellulose is one of the main sources of anionic waste. Because hemicellulose is interwoven with lignin and cellulose, a stepwise treatment is used to remove hemicellulose, considering that some of the lignin should be intentionally retained.
(7) Remove pectin. Pectin is another main source of anionic waste. Pectin mainly exists in intercellular layer, intracellular cavity, and cortex of cotton stalk. The stepwise removal of pectin included: the first step focused on the removal of pectin from the cortex of cotton stalk, and the second step focused on the removal of residual pectin from the intercellular layer and intracellular cavity. Because fulvic acid is mainly used as a fertilizer additive, the Na ion content in the whole production system should be controlled. Sodium oxalate, an additive in digestion in the present invention, is used for pectin decomposition, so the total amount of sodium oxalate should be controlled to control the Na ion content in fulvic acid.

The third is to consider the resource utilization and environmental protection of pulping wastewater:
(8) it is proposed to use ammonium sulfite method for pulping and direct extraction of pulping effluent to obtain fulvic acid.
(9) The pH is controlled at 5-7 to make the hemicellulose decompose under weak acidic condition on the one hand, and to keep the color of the formed pulp as dark brownish red on the other hand, to reduce the bleaching cost and improve the commerciality of the molded food-container.
(10) The digestion intensity is controlled to balance the fiber properties required for molded food-containers with the digestion requirements for fulvic acid production. From the performance requirements of molded food-container pulp, cellulose needs to be removed from impurities and washed and separated, and some lignin needs to be retained; from the mechanism of fulvic acid production, the main source of fulvic acid is sulfonated lignin, and part of the native lignin needs to be retained in the cellulose during processing, while part of the sulfonated lignin needs to be separated from the cellulose to enter the pulping black liquor and washing black liquor. Therefore, to some extent, the digestion process of pulping also controls the separation degree of lignin and cellulose, and the ratio of lignin remaining in fiber and sulfonated lignin entering pulping black liquor. According to the experimental optimization, a more balanced state can be achieved when a kappa number is 20-30, a fiber yield is 50%, a yield of the concentrated dry powder of fulvic acid black liquor is 50% and a dry base content of fulvic acid therein is more than 40%.

(11) A two-step extraction of fulvic acid was taken, including extraction by digesting and washing pulp after defibering.

(12) A three-step process for removing pectin, a two or three-step process for removing hemicellulose and a two-step process for extracting fulvic acid are integrated to form a complete process scheme.

(13) Using cationic starch to remove other anionic waste from the pulp.

(14) The principle of solving the problem is comprehensive utilization of straw resources, environmental protection, especially pulping pollution, and increasing added value.

According to the above ideas, the present invention provides a method for co-producing molded food-container pulp and fulvic acid from cotton stalk.

The method for co-producing molded food-container pulp and fulvic acid from cotton stalk, comprising:

step 1: digesting a cotton stalk raw material to hydrolyze hemicellulose and pectin and retain part of lignin to obtain a pulp;

defibering the pulp by a high consistency refiner and separating to obtain a coarse pulp and a pulping black liquor;

defibering the coarse pulp by a low consistency refiner to expose residual hemicellulose and residual pectin to obtain a semi-finished pulp;

bio-treating the semi-finished pulp to remove residual hemicellulose and residual pectin, and to remove anionic waste to obtain a final pulp;

wherein, digesting the cotton stalk raw material by adopting an ammonium sulfite method; and a by-product of the digesting process is fulvic acid;

wherein, fulvic acid is also obtained as a by-product while obtaining the finished pulp with the low beating degree for molded food-container that removes anionic waste and retains some lignin;

step 2: pulp proportioning, in other words, mixing of a cotton stalk molded food-container pulp having low beating degree and a straw chemical pulp having high beating degree to adjust the pulp to reduce the beating degree and increase the water filtration.

In some embodiments, a process condition for digesting by an acid ammonium sulfite method is as follows: a liquid ratio of 1:5, ammonium sulfite of 10%, sodium oxalate of 0.5%, penetrant JFC of 0.01%, acid of 0-2%, which is selected from one or a combination of sulfuric acid, hydrochloric acid and nitric acid, pH 5-7, 140-165° C., preferably 150° C., holding 60-90 min. A finished pulp is obtained, and with a kapper number of 20-25. Optimization of digesting intensity with a final cellulose yield of 50% and a final yield of 50% of a concentrated and dried fulvic acid black liquor, in which the dry basis content of fulvic acid is greater than 40%.

In some embodiments, in the method for co-producing molded food-container pulp and fulvic acid from cotton stalk, defibering the pulp by a high consistency refiner and separating to obtain a coarse pulp and a pulping black liquor; a pulp consistency of the coarse pulp is 30-35%, a gap of the refiner is 0.15-0.25, a beating degree is 18-22° SR.

In some embodiments, a coarse pulp and a pulping black liquor are separated in the method for co-producing molded food-container pulp and fulvic acid from cotton stalk.

In some embodiments, in the method for co-producing molded food-container pulp and fulvic acid from cotton stalk, defibering the coarse pulp by a low consistency refiner to expose residual hemicellulose and residual pectin to obtain a semi-finished pulp; a pulp consistency of the semi-finished pulp is 3-6%, a beating degree is 22-28° SR.

In some embodiments, in the method for co-producing molded food-container pulp and fulvic acid from cotton stalk, biological treating the semi-finished pulp to remove residual hemicellulose and pectin under conditions that a pulp consistency of 3-8%, temperature of 45-65° C., preferably 55° C. for 40-90 min, pH 5-7, pectinase with enzyme activity of 30,000 U/mg in 100 g amount per ton pulp, hemicellulase with enzyme activity of 30,000 U/mg in 100 g amount per ton pulp, penetrant JFC of 0.01%, EDTA of 0.01-0.5%, stirring.

In some embodiments, in the method for co-producing molded food-container pulp and fulvic acid from cotton stalk, with an addition of cationic starch (commercially available) of 0.5% in the biological treatment step.

In some embodiments, in the method for co-producing molded food-container pulp and fulvic acid from cotton stalk, a three-step pectin removal, a three-step hemicellulose removal and a two-step extraction of fulvic acid, including extraction by digesting and washing pulp after defibering, are organically integrated to form a complete process scheme.

In some embodiments, when pulp proportioning, a cotton stalk food-container pulp with a beating degree of 22-28° SR is mixed with a straw chemical pulp with a beating degree of 35-45° SR in a ratio of (20-80):(80-20) to obtain a mixed pulp with a beating degree of 35-45° SR to increase water filtration. The straw chemical pulp is a chemical pulp made from one or more of wheat stalk, reed, rice straw and bagasse.

In some embodiments, in the method for co-producing molded food-container pulp and fulvic acid from cotton stalk, a non-wood fiber raw material comprises cotton stalk, wheat stalk, bagasse, reeds, bamboo, mulberry branches, bamboo-willow, *broussonetia papyrifera*, etc., as well as timber offcuts and brushwood.

In some embodiments, a cotton stalk molded food-container pulp prepared by any of the methods mentioned above is provided.

The present invention is described in further detail below in connection with specific embodiments which should be noted as an interpretation of the present invention and not as a limitation.

In the following examples, a beating degree of commercially available pulps is 35-45° SR, which can be selected and adjusted according to the beating degree of the mixed pulp after pulp proportioning.

Example 1 cotton stalk was used as raw material to produce molded food-container pulp and fulvic acid.

Step 1: material preparation. 1000 g of dry cotton stalk was taken, washed and drained.

Step 2: digestion. The raw materials were loaded into a 15 L electric rotary digester for digestion to obtain a pulp with a kappa number of 24.4. The process conditions of digestion were as follows: a liquid ratio of 1:5, ammonium sulfite of 10%, sulfuric acid of 0.1%, sodium oxalate of 0.5%, pH 6.5, heating to 120° C. and releasing steam, rising to 160° C. and maintaining the temperature for 60 min.

Step 3: high consistency refining and defibering. The pulp was refined in a KRK300 refiner with a gap of 0.5 mm in first stage, 0.25 mm in the second stage, 0.15 mm in the third stage, wherein a pulp consistency was 30%, a beating degree was 21° SR, and a total water content was 10 kg.

Step 4: separating fiber and washing water. The pulp was shaken out with a centrifuge to obtain a coarse pulp and a fulvic acid black liquor. A yield of the coarse pulp was 58%, and a dry basis content of fulvic acid was 30.73%.

Step 5: defibering the coarse pulp with a low consistency refiner to obtain a semi-finished pulp, with a pulp consistency of 3-6%, a beating degree of 25° SR and a semi-finished pulp yield of 54%.

Performance Detection of a Semi-Finished Food-Container Pulp:

|  | Quantitative ($g/m^2$) | Breaking length (km) | Bursting index ($Kpa \cdot m^2/g$) | Ring crush compression resistance index ($N \cdot m/g$) | Apparent density ($g/cm^3$) | Kappa number | Beating degree (° SR) |
|---|---|---|---|---|---|---|---|
| Numerical value | 90 | 4.66 | 7.09 | 0.413 | 0.395 | 36.1 | 25 |

A breaking length of the semi-finished pulp was 4.66 km, which can effectively meet the requirement of strength of a food-container; a kappa number of the semi-finished pulp was 36.1, which was equivalent to a lignin content of 5.96%, and a lignin removal rate was about 75%, which can meet the needs of a food-container to form an oil-proofing film.

Step 6: biological treatment on the semi-finished pulp. The biological treatment to remove residual hemicellulose and pectin comprises: 1 g/kg of liquid pectinase (produced by Beijing Shengshi Jiaming Biotechnology Co., Ltd.) with an activity of 3000 U/g, 0.2 g/kg of hemicellulase reagent (produced by Nanjing Dulai Biotechnology Co., Ltd.) with an activity of 5 U/mg, 0.01% penetrant JFC and 0.1% EDTA were added to the semi-finished pulp with a pulp consistency of 5% and a temperature of 50° C.; stirring and holding for 60 min; then, 0.5% cationic starch was added, stirring, holding at a temperature of 50° C. for 30 min.

Step 7: production of a molded food-container. The production process was carried out in a trial plant of a company producing export molded food-containers.

(1) Pulp proportioning

Experimental group: 60% cotton stalk molded food-container pulp, i.e. unbleached semi-chemical pulp prepared from the above steps, 20% commercially available unbleached wheat stalk chemical pulp and 20% commercially available unbleached reed chemical pulp.

The beating degree of the commercial chemical pulp was 35-45° SR.

Comparison group 1: 60% commercially available unbleached bagasse chemical pulp, 20% commercially available unbleached wheat stalk chemical pulp and 20% commercially available unbleached reed chemical pulp.

Comparison group 2: 60% commercially available cottonwood chemi-mechanical pulp, 20% commercially available unbleached wheat stalk chemical pulp and 20% commercially available unbleached reed chemical pulp.

(2) The addition amount of the auxiliary agent. 1% cationic fluorinated water and oil-proofing agent (commercially available, AsahiGuard, Japan); 4% waterproofing agent (Shanghai Luowan Technology Development Co., Ltd.).

(3) Papermaking a 600 mL, 30 g flip-top molded food-container comprises: mixing the pulp and the auxiliary agents to obtain a mixed pulp with a beating degree of 39° SR, and then carrying out the procedures of beating, paper making, cold pressing and hot pressing in sequence, wherein the hot-pressing temperature was 198° C.

(4) Performance comparison of molded food-containers.

The testing standard is national standard GB/T36787-2018: pulp molding tableware.

Water leakage performance, qualified standard: no leakage.

Heat resistance (hot water resistance, hot oil resistance):

(95° C.±5° C.) water, 30 min, qualified standard: no infiltration, no leakage, and no deformation.

(95° C.±5° C.) oil, 30 min, qualified standard: no infiltration, no leakage, and no deformation.

|  | Experimental group | Comparison group 1 | Comparison group 2 | Remarks |
|---|---|---|---|---|
| Oil-roofing | Qualified | Qualified | Unqualified | National standard GB/T36787-2018: pulp molding tableware. |
| Waterproofing | Qualified | Qualified | Unqualified | |
| Stiffness Handle | stiff | Softer | stiff | No national standard for this item. |

Example 2

Cotton stalk was used as raw material to produce molded food-container brown pulp and fulvic acid.

Step 1: material preparation. 3 tons of cotton stalk absolute drying material, washed by drum washer and dehydrated by screw dehydrator.

Step 2: digestion. The raw materials were packed into a 40 cubic spherical boiler and the process conditions of digestion were as follows: a liquid ratio of 1:6, ammonium sulfite of 10%, sulfuric acid of 0.1%, sodium oxalate of 0.5%, penetrant JFC of 0.01%, pH 6.5, heating to 120° C. and releasing steam, rising to 150° C. and maintaining the temperature for 90 min, spraying to obtain a pulp with a pulp consistency of 15%.

Step 3: squeezing and refining the pulp. Firstly, the pulp was firstly squeezed and washed in two stages using a thread rolling and squeezing machine, with a consistency of 15% at an inlet of the machine and 38% at an outlet of the machine, collecting a pulp at the outlet and a fulvic acid black liquor, with a volume of 6 tons of the black liquor per ton of the pulp (collected at the outlet) and a solid content of 16%; then the pulp was refined by a high consistency refiner of 900 mm diameter to obtain a coarse pulp with a beating degree of 23° SR. The solid base content of fulvic acid was 42.6%.

Step 4: further defibering the coarse pulp to obtain a semi-finished pulp, with a pulp consistency of 5%, then low consistency refining at 600 mm diameter to obtain 1.6 tons of semi-finished pulp with a beating degree of 28° SR. Performance Detection of the Semi-Finished Cotton Stalk Food-Container Pulp:

| | Quantitative ($g/m^2$) | Tensile index ($N \cdot m/g$) | Bursting index ($Kpa \cdot m^2/g$) | Ring crush compression resistance index ($N \cdot m/g$) | Apparent density ($g/cm^3$) | Kappa number | Beating degree (° SR) |
|---|---|---|---|---|---|---|---|
| Numerical value | 91 | 53.01 | 2.71 | 6.84 | 0.39 | 29 | 32 |

A tensile index of the semi-finished pulp was 53.01 N·m/g, which can effectively meet the requirement of strength of a food-container; a kappa number of the semi-finished pulp was 29, which was equivalent to a lignin content of 4.79%, and a lignin removal rate was about 77%, which can meet the needs of a food-container to form an oil-proofing film.

Step 5: biological treatment of the semi-finished pulp. The semi-finished pulp was de-slagged, screened, and concentrated to 8% by a high-speed pulp washer, and was fed into a 50 cubic meter concrete pool lined with fiber reinforced plastics, added with 12 tons of water, heated to 50° C. by steam and stirred. Wherein, the semi-finished pulp from the high-speed pulp washer was all fed into the pool, steam is used to heated to 50° C. and holding the temperature. Auxiliary agents, 1 g/kg of liquid pectinase (produced by Beijing Shengshi Jiaming Biotechnology Co., Ltd.) with an activity of 3000 U/g, 0.1 g/kg of food-grade hemicellulase (purchased in the market) with an activity of 30000 U/mg and 0.5% EDTA were added to the pool, stirring and holding at a temperature of 50° C. for 40 min; then, 0.5% cationic starch was added, stirring, holding at a temperature of 50° C. for 30 min. The pulp was dehydrated to 30% pulp consistency by a twin wire squeezing machine and for later use.

Step 6: papermaking a molded food-container. The production process was carried out in a trial plant of a company producing export molded food-containers.

(1) Pulp proportioning

Experimental group: 60% cotton stalk molded food-container pulp, i.e. unbleached semi-chemical pulp prepared from the above steps, 20% unbleached wheat stalk chemical pulp and 20% unbleached reed chemical pulp.

The beating degree of the commercial chemical pulp was 35-45° SR.

Comparison group 1: 60% unbleached bagasse chemical pulp, 20% unbleached wheat stalk chemical pulp and 20% unbleached reed chemical pulp.

Comparison group 2: 60% cottonwood chemi-mechanical pulp, 20% unbleached wheat stalk chemical pulp and 20% unbleached reed chemical pulp.

(2) The addition amount of the auxiliary agent. 1% cationic fluorinated water and oil proofing agent (commercially available, AsahiGuard, Japan); 4% waterproofing agent (Shanghai Luowan Technology Development Co., Ltd.).

(3) Papermaking a 600 mL, 30 g flip-top molded food-container comprises: mixing the pulp and the auxiliary agents to obtain a mixed pulp with a beating degree of 38° SR, and then carrying out the procedures of beating, paper making, cold pressing and hot pressing in sequence, wherein the hot-pressing temperature was 198° C.

(4) Performance comparison of molded food-containers.

The testing standard is national standard GB/T36787-2018: pulp molding tableware.

Water leakage performance, qualified standard: no leakage.

Heat resistance (hot water resistance, hot oil resistance):

(95° C.±5° C.) water, 30 min, qualified standard: no infiltration, no leakage, and no deformation.

(95° C.±5° C.) oil, 30 min, qualified standard: no infiltration, no leakage, and no deformation.

| | Experimental group | Comparison group 1 | Comparison group 2 | Remarks |
|---|---|---|---|---|
| Oil-proofing | Qualified | Qualified | Unqualified | National standard GB/T36787-2018: pulp molding tableware. |
| Waterproofing | Qualified | Qualified | Unqualified | |
| Stiffness Handle | stiff | Softer | stiff | GB/T36787 No national standard for this item. |

Example 3

Wheat stalk was used as raw material to produce molded food-container pulp and fulvic acid.

Step 1: material preparation. 3 tons of wheat stalk absolute drying material, crushed, screened to remove soil and iron, and fed to 25 cubic meters of spherical boiler by belt.

Step 2: digestion. The process conditions of digestion were as follows: a liquid ratio of 1:6, ammonium sulfite of 10%, hydrochloric acid of 0.1%, pH 7, heating to 120° C. and releasing steam, rising to 150° C. and maintaining the temperature for 90 min, spraying to obtain a pulp with a pulp consistency of 15%.

Step 3: squeezing and refining the pulp. Firstly, the pulp was washed counter-currently in four stages using a twin-roll squeezing machine, with a consistency of 15% at an inlet of the machine and 38% at an outlet of the machine, a fulvic acid black liquor was collected, with a volume of 5.5 tons of the black liquor per ton of the pulp and a solid content of 18%; and a coarse pulp was obtained with a beating degree of 21° SR, a fulvic acid solid base content of 43% and a kappa number of 29.

Step 4: further defibering the coarse pulp in a 600 mm diameter low consistency refiner to obtain 1.55 tons of semi-finished pulp, with a pulp consistency of 5%, and a beating degree of 26° SR.

Performance Detection of a Semi-Finished Food-Container Pulp:

|  | Quantitative ($g/m^2$) | Tensile index ($N \cdot m/g$) | Bursting index ($Kpa \cdot m^2/g$) | Ring crush compression resistance index ($N \cdot m/g$) | Apparent density ($g/cm^3$) | Kappa number | Beating degree (° SR) |
|---|---|---|---|---|---|---|---|
| Numerical value | 95 | 44.01 | 2.03 | 4.36 | 0.42 | 25 | 26 |

A tensile index of the semi-finished pulp was 44.01 N·m/g, which can effectively meet the requirement of strength of a food-container; a kappa number of the semi-finished pulp was 25, which was equivalent to a lignin content of 4.125%, and a lignin removal rate was about 77%, which can meet the needs of a food-container to form an oil-proofing film.

Step 6: biological treatment of the semi-finished pulp. The semi-finished pulp was de-slagged, screened, and concentrated to 8% by a high-speed pulp washer, and was fed into a 50 cubic meter concrete pool lined with fiber reinforced plastics, added with 12 tons of water, heated to 60° C. by steam and stirred. Wherein, the semi-finished pulp from the high-speed pulp washer was all fed into the pool, and auxiliary agents were added when using steam to heated to 50° C. and holding the temperature. 0.1 g/kg of hemicellulase (commercially available) with an activity of 30000 U/mg, 0.01% penetrant JFC and 0.5% EDTA were added to the pool, stirring, and holding at a temperature of 50° C. for 40 min; then, 0.5% cationic starch was added, stirring, holding at a temperature of 50° C. for 30 min. The pulp was dehydrated to a pulp consistency of 30% by a twin wire squeezing machine and for later use.

Step 7: production of a molded food-container. The production process was carried out in a trial plant of a company producing export molded food-containers.

(1) Pulp proportioning

Experimental group: 70% wheat stalk molded food-container pulp, i.e. unbleached semi-chemical pulp prepared by the above steps, 30% unbleached reed chemical pulp.

Comparison group 1: 70% unbleached bagasse chemical pulp and 30% unbleached reed chemical pulp.

Comparison group 2: 60% cottonwood chemi-mechanical pulp, 30% unbleached wheat stalk chemical pulp and 30% unbleached reed chemical pulp.

(2) The addition amount of the auxiliary agent. 1% cationic fluorinated water and oil proofing agent (commercially available, AsahiGuard, Japan); 4% waterproofing agent (Shanghai Luowan Technology Development Co., Ltd.).

(3) Papermaking a 600 mL, 30 g flip-top molded food-container comprises: mixing the pulp and the auxiliary agents to obtain a mixed pulp with a beating degree of 40° SR, and then carrying out the procedures of beating, paper making, cold pressing and hot pressing in sequence, wherein the hot-pressing temperature was 198° C.

(4) Performance comparison of molded food-containers.

The testing standard is national standard GB/T36787-2018: pulp molding tableware.

Water leakage performance, qualified standard: no leakage.

Heat resistance (hot water resistance, hot oil resistance):

(95° C.±5° C.) water, 30 min, qualified standard: no infiltration, no leakage, and no deformation.

(95° C.±5° C.) oil, 30 min, qualified standard: no infiltration, no leakage, and no deformation.

|  | Experimental group | Comparison group 1 | Comparison group 2 | Remarks |
|---|---|---|---|---|
| Oil-proofing | Qualified | Qualified | Unqualified | National standard GB/T36787-2018: pulp molding tableware. |
| Waterproofing | Qualified | Qualified | Unqualified | |
| Stiffness Handle | stiff | Softer | stiff | No national standard for this item. |

Example 4

Comparative experiment. The oil and water resistance of an imported P-RC APMP bleached softwood chemi-mechanical pulp was investigated after biological treatment under the similar conditions.

Step 1: material preparation. 100 kg (absolute drying) of bleached softwood chemi-mechanical pulp and 100 kg (absolute drying) of unbleached cotton stalk molded food-container pulp prepared by example 2 were taken respectively.

Step 2: loading the materials: the pulps in step 1 were put into 3 cubic meters stirring tank, 1000 kg of water were added into the tank, stirring, heating to 50° C. and holding the temperature.

Step 3: biological treatment. Auxiliary agents, 1 g/kg of liquid pectinase (produced by Beijing Shengshi Jiaming Biotechnology Co., Ltd.) with an activity of 3000 U/g, 0.1 g/kg of food-grade hemicellulase (purchased in the market) with an activity of 30000 U/mg and 0.5% EDTA were added to the tank, stirring and holding at a temperature of 50° C. for 60 min; then, 0.5% cationic starch was added, stirring, holding at a temperature of 50° C. for 30 min. The pulp was dehydrated to 28% pulp consistency and for later use.

Step 4: pulp proportioning.

Raw material ratio:

Comparison group 1: 70% imported bleached chemi-mechanical pulp and 30% unbleached reed chemical pulp.

Comparison group 2: 70% unbleached cotton stalk molded food-container pulp (prepared in example 2) and 30% unbleached reed chemical pulp.

Step 5: oil and water resistance test.

Papermaking molded food-containers:

The addition amount of the auxiliary agent: 0.85-1% cationic fluorinated water and oil proofing agent (commercially available, AsahiGuard, Japan); 4% waterproofing agent (Shanghai Luowan Technology Development Co., Ltd.).

Results of oil and water resistance test:

The oil and water resistance of the molded food-container prepared by unbleached cotton stalk semi-chemical pulp (example 2) was qualified, while the oil and water resistance of the molded food-container prepared by the imported P-RC APMP bleached softwood chemi-mechanical pulp was unqualified.

Example 5

Cotton stalk was used as raw material to produce unbleached molded food-container pulp and fulvic acid.

Steps 1 to 5 are the same as Example 2.

Step 6: papermaking molded food-containers. The production process was carried out in a trial plant of a company producing export molded food-containers.

(1) Pulp proportioning

Experimental group: 70% cotton stalk molded food-container pulp, i.e. unbleached semi-chemical pulp prepared from the above steps and 30% unbleached reed chemical pulp.

Comparison group 1: 70% unbleached bagasse chemical pulp, 15% unbleached wheat stalk chemical pulp and 15% unbleached reed chemical pulp.

Comparison group 2: 20% cottonwood chemi-mechanical pulp, 40% unbleached wheat stalk chemical pulp and 40% unbleached reed chemical pulp.

The beating degree of the commercial chemical pulp was 35-45° SR.

(2) The addition amount of the auxiliary agent. 0.85-1% cationic fluorinated water and oil-proofing agent (commercially available, AsahiGuard, Japan); 4% waterproofing agent (Shanghai Luowan Technology Development Co., Ltd.).

(3) Making a 600 mL, 30 g flip-top molded food-container comprises: mixing the pulp and the auxiliary agents to obtain a mixed pulp with a beating degree of 35° SR, and then carrying out the procedures of beating, paper making, cold pressing and hot pressing in sequence, wherein the hot-pressing temperature was 198° C.

(4) Comparison of oil and water resistance:

The testing standard is national standard GB/T36787-2018: pulp molding tableware.

Water leakage performance, qualified standard: no leakage.

Heat resistance (hot water resistance, hot oil resistance): (95° C.±5° C.) water, 30 min, qualified standard: no infiltration, no leakage, and no deformation.

(95° C.±5° C.) oil, 30 min, qualified standard: no infiltration, no leakage, and no deformation.

|  | Experimental group | Comparison group 1 | Comparison group 2 | Remarks |
| --- | --- | --- | --- | --- |
| Oil-proofing | Qualified | Qualified | Unqualified | National standard GB/T36787-2018: pulp |
| Waterproofing | Qualified | Qualified | Unqualified | |
| Stiffness Handle | stiff | Softer | stiff | molding tableware. No national standard for this item. |

Finally, it should be noted that, the above description is only a preferred embodiment of the present invention and is not intended to limit the present invention. Although the present invention has been described in detail with reference to the foregoing embodiments, it is still possible for those skilled in the art to modify the technical solution described in the foregoing embodiments, or to replace some of them equivalently. Any modifications, equivalents, improvements, etc. made within the spirit and principles of the present invention shall be covered by the protection of the present invention rights.

What is claimed is:

1. A method for co-producing molded food-container pulp and fulvic acid from cotton stalk, comprising:
    step 1, pulping, comprising:
        digesting a cotton stalk raw material to hydrolyze hemicellulose and pectin and retain part of lignin to obtain a pulp;
        defibering the pulp by a first refiner having a consistency of 25 to 35% and separating to obtain a coarse pulp and a pulping black liquor;
        defibering the coarse pulp by a second refiner having a consistency of 3 to 6% to expose residual hemicellulose and residual pectin to obtain a semi-finished pulp;
        bio-treating the semi-finished pulp to remove residual hemicellulose and residual pectin, and to remove anionic waste to obtain a finished pulp;
    wherein, digesting the cotton stalk raw material by adopting an ammonium sulfite method; and a by-product of the digesting process is fulvic acid;
    wherein, fulvic acid is also obtained as a by-product while obtaining the finished pulp with a low beating degree of 22-28° SR for molded food-container that removes anionic waste and retains some lignin;
    step 2: pulp proportioning, comprising:
        mixing of the finished pulp with the low beating degree for molded food container and a straw chemical pulp having a high beating degree of 35-45° SR to adjust the pulp to reduce the beating degree and increase the water filtration.

2. The method as claimed in claim 1, wherein the digesting the cotton stalk raw material by adopting the ammonium sulfite method under conditions that: a solid to liquid ratio of 1:5 by weight, ammonium sulfite of 10%, sodium oxalate of 0.5%, acid of 0-2%, which is selected from one or a combination of sulfuric acid, hydrochloric acid and nitric acid, pH 5-7, penetrant JFC of 0.01%, 140-165° C. holding 60-90 min; the pulp obtained after digesting, with a kappa number of 20-30, a lignin content of 3.3-4.95%, and wherein all percentages are by weight.

3. The method as claimed in claim 1, wherein the defibering the pulp by the first refiner refers to rubbing peeling and defibering of a fiber pulp using the first refiner, a pulp consistency of the coarse pulp is 25-35%, a gap of the refiner is 0.15-0.25 mm, a beating degree is 20-25° SR.

4. The method as claimed in claim 1, wherein the coarse pulp and the pulping black liquor are obtained by multi-stage reverse washing after defibering of the pulp with the first refiner, and the pulping black liquor is fulvic acid black liquor.

5. The method as claimed in claim 1, wherein a pulp consistency of the semi-finished pulp is 3-6% and a beating degree is 25-30° SR.

6. The method as claimed in claim 1, wherein the biotreating the semi-finished pulp to remove residual hemicellulose and residual pectin under conditions that: a pulp consistency of the semi-finished pulp is 3-8%, temperature of 45-55° C. for 40-90 min, pectinase with enzyme activity of 30,000 U/mg in 100 g amount per ton pulp, hemicellulase with enzyme activity of 30,000 U/mg in 100 g amount per ton pulp, ethylenediaminetetraacetic acid (EDTA) addition amount of 0.01-0.5% by weight, stirring during the biotreating.

7. The method as claimed in claim 1, wherein a cationic starch with amount of 0.5% by weight is added in biotreating the semi-finished pulp.

8. The method as claimed in claim 1, wherein a three-step pectin removal, a three-step hemicellulose removal and a two-step extraction of fulvic acid, comprising extraction by digesting and washing the semi-finished pulp after defibering, are integrated to form a complete process scheme.

9. The method as claimed in claim 1, wherein when pulp proportioning, the finished pulp with the low beating degree is mixed with the straw chemical pulp with the high beating degree in a ratio of (20-80):(80-20) to obtain a mixed pulp with a high beating degree of 30-40° SR; the straw chemical pulp is a chemical pulp made from one or more of wheat stalk, reed, rice straw and bagasse.

* * * * *